3,290,400
PROCESS FOR THE PRODUCTION OF
CYCLOALKENES
Hans-Helmut Schwarz and Karl Morgenstern, Krefeld,
Germany, assignors to Farbenfabriken Bayer Aktiengesellschaft, Leverkusen, Germany, a German corporation
No Drawing. Filed Mar. 31, 1965, Ser. No. 444,444
Claims priority, application Germany, Apr. 9, 1964,
F 42,562
13 Claims. (Cl. 260—666)

The present invention is concerned with a process for the production of cycloalkenes.

It is known to produce cycloalkenes by splitting off hydrogen chloride from chlorocycloalkanes in that these are passed at an elevated temperature in vapourous form over solid catalysts, such as aluminum oxide or aluminium silicate. The results thus obtained are, however, unsatisfactory since these reactions give comparatively poor yields with a low conversion, resinification also frequently takes place and the activity of the catalysts used prematurely decreases. On the other hand, it is not possible to carry out the splitting off of hydrogen chloride by thermal means without the use of catalysts since, for this purpose, temperature of 500° C. and more would be necessary but, on the other hand, cyclohexene, for example, already polymerises at temperatures of about 400° C. so that only a small quantity of monomeric cyclohexene is obtained, besides dimeric, trimeric and higher molecular products.

We have now, surprisingly, found that the above-mentioned disadvantages can be avoided and cycloalkenes are obtained in high yields, without resinification and with a high conversion, from chlorocycloalkanes by splitting off hydrogen chloride at an elevated temperature, in that the chlorocycloalkanes in gaseous form and mixed with steam are briefly heated to temperatures between 300 and about 800° C.

The reaction is expediently carried out in such a manner that the chlorocycloalkanes and water are evaporated either separately or together and the vapour mixture is subsequently heated to the reaction temperature in a suitable device, for example, a reaction tube of corrosion-resistant material, such as ceramic material, stainless steel or the like. The reactor used may be empty or filled, for example, with ceramic or other fillers. After leaving the reactor, the reaction mixture is condensed in the usual manner, for example, in a cooling device or by introducing, through a nozzle, a water jet. It thereby separates into an organic and an aqueous phase, the latter containing the hydrogen chloride which has been split off. Possibly after washing and neutralization, the organic phase is worked up in the usual manner, for example, by fractional distillation. It consists almost completely of the desired cycloalkene with a small content of unreacted chlorocycloalkane, which may be returned to the reactor.

The process according to the present invention can be carried out at atmospheric pressure or at a reduced pressure. In general, good results are achieved within a temperature range of about 300 to about 800° C., but it is frequently expedient to carry out the reaction at temperatures of about 450 to about 600° C., whereby especially good results can be obtained. With residence times of about 0.01 to about 20 seconds, preferably about 0.1 to about 5 seconds, high conversions can thus be attained, for example, of more than 95% and with yields which are just as high.

The ratio of chlorocycloalkane to steam can vary within wide limits. In general, it is expedient to use about 0.1 to about 50 mol water per mol chlorocycloalkane. Especially good results are frequently achieved by the addition of about 1 to 10 mol water per mol chlorocycloalkane.

Chlorocycloalkanes which can be converted into the corresponding cycloalkenes by the process according to the present invention are, for example, chlorocyclopentane, chlorocyclohexane and chlorocycloheptane, as well as the corresponding alkyl- and cycloalkyl-substitution products of these compounds, for example, 2-chloro-1-methylcyclohexane, 1-methyl - 4 - chlorocyclohexane, and chlorocyclohexyl-cyclohexane.

The following examples are given for the purpose of illustrating the present invention.

*Example 1*

A mixture of 59.3 g. chlorocyclohexane and 94.0 g. water is passed in a vaporous state, through an empty ceramic tube (diameter: 2cm.; length: 25 cm.) heated to 500° C. with an average residence time of 0.7 second. The reaction mixture obtained is subsequently cooled and the organic phase separated and distilled. Apart from 1 g. unreacted chlorocyclohexane, there are obtained 39 g. cyclohexene, corresponding to a yield of 95% of theory.

*Example 2*

A mixture of 136 g. of chlorocyclopentane and 108 g. water is passed in a vaporous state through an empty stainless steel tube ("Remanit"; diameter: 2 cm.; length: 25 cm.), heated to 500° C. with an average residence time of 0.8 second. The reaction mixture obtained is subsequently cooled and the organic phase separated and distilled. Apart from 34 g. unreacted chlorocyclopentane, there are obtained 60.5 g. cyclopentene, corresponding to a yield of 91% of theory.

*Example 3*

A mixture of 132.5 g. of chlorocycloheptane and 108 g. water is passed in a vaporous state, through an empty stainless steel tube ("Remanit"; diameter: 2 cm.; length: 25 cm.), heated to 500° C. with an average residence time of 0.9 second. The reaction mixture obtained is subsequently cooled and the organic phase separated and distilled. Apart from 4 g. unreacted chlorocycloheptane, there are obtained 81.5 g. cycloheptene, corresponding to a yield of 87% of theory.

*Example 4*

A mixture of 132.5 g. of 1-methyl-4-chlor-cyclohexane and 108 g. water is passed in a vaporous state, through an empty stainless steel tube ("Remanit"; diameter: 2 cm.; length: 25 cm.), heated to 500° C. with an average residence time of 0.9 second. The reaction mixture obtained is subsequently cooled and the organic phase separated and distilled. Apart from 25 g. unreacted 1-methyl-4-chlorohexane, there are obtained 66 g. 1-methyl-cyclohexene-3, corresponding to a yield of 85% of theory.

We claim:

1. Process for the production of cycloalkenes by splitting off hydrogen chloride from chlorocycloalkanes at an elevated temperature, which comprises heating a chlorocycloalkane in gaseous form, in admixture with steam, to a temperature between about 300 and about 800° C. and at a pressure at least as low as atmospheric pressure whereby to form the corresponding cycloalkene.

2. Process according to claim 1, wherein the mixture of chlorocycloalkane in gaseous form and steam is heated to a temperature between about 450 and about 600° C.

3. Process according to claim 1, wherein the reaction is carried out with a residence time of about 0.01 to about 20 seconds.

4. Process according to claim 3, wherein the reaction is carried out with a residence time of about 0.1 to about 5 seconds.

5. Process according to claim 1, wherein about 0.1 to about 50 mols of water are used per mol of chlorocycloalkane.

6. Process according to claim 5, wherein about 1 to about 10 mols of water are used per mol of chlorocycloalkane.

7. Process according to claim 5, wherein the chlorocycloalkane used is chlorocyclohexane.

8. Process according to claim 5, wherein the chlorocycloalkane used is chlorocyclopentane.

9. Process according to claim 5, wherein the chlorocycloalkane used is chlorocycloheptane.

10. Process according to claim 5, wherein the chlorocycloalkane used is 1-methyl-4-chlorocyclohexane.

11. Process for the production of cycloalkenes by splitting off hydrogen chloride from chlorocycloalkanes at an elevated temperature, which comprises heating at a temperature substantially between about 300 and 800° C. and at a pressure at least as low as atmospheric pressure for a period substantially between about 0.01 and 20 seconds a gaseous mixture of a chlorocycloalkane and water in the ratio of substantially between about 0.1 and 50 mols of water per mol of the chlorocycloalkane, to split off hydrogen chloride, and recovering the corresponding cycloalkene thereby formed.

12. Process according to claim 11 wherein said recovering is carried out by condensing the resulting reaction mixture which thereby separates into an organic phase and an aqueous phase, fractionally distilling the organic phase to separate the corresponding cycloalkene from attendant unreacted chlorocycloalkane, and recycling said unreacted chlorocycloalkane to the heating step.

13. Process according to claim 12 wherein said chlorocycloalkane is selected from the group consisting of chlorocyclopentane, chlorocyclohexane, chlorocycloheptane, 2-chloro-1-methylcyclohexane, 1-methyl - 4 - chlorocyclohexane, and chlorocyclohexyl-cyclohexane.

References Cited by the Examiner
UNITED STATES PATENTS

| | | | |
|---|---|---|---|
| 2,243,191 | 5/1941 | Cantzler et al. | 260—666 |
| 2,436,491 | 2/1948 | Schmerling | 260—666 |

DELBERT E. GANTZ, *Primary Examiner.*

V. O'KEEFE, *Assistant Examiner.*